(No Model.) 2 Sheets—Sheet 1.
E. R. KNOWLES.
SECONDARY BATTERY PLATE.
No. 397,557. Patented Feb. 12, 1889.
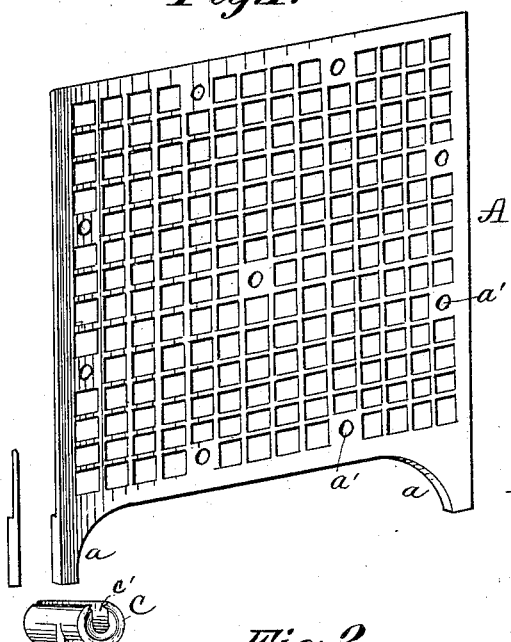
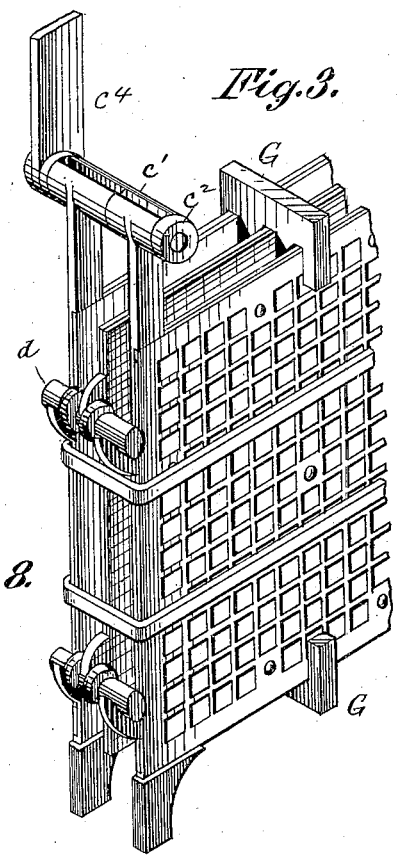
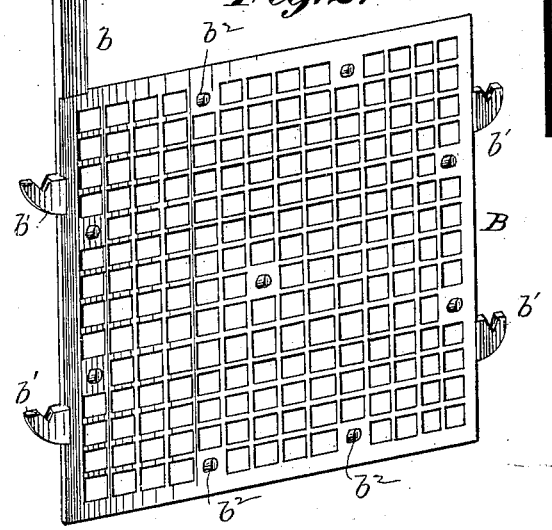
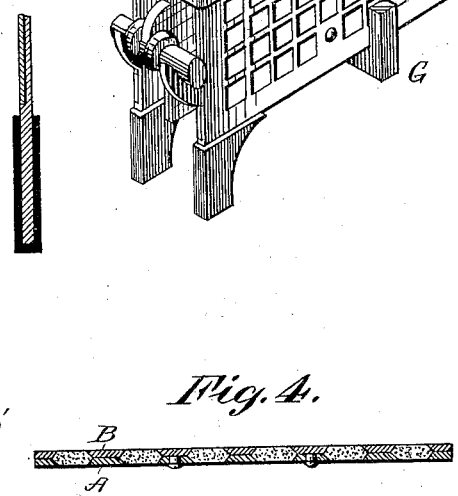
Witnesses:
D. W. Gardner
Wm. N. Rosenbaum
Inventor:
Edward R. Knowles (No Model.) 2 Sheets—Sheet 2.
E. R. KNOWLES.
SECONDARY BATTERY PLATE.
No. 397,557. Patented Feb. 12, 1889.
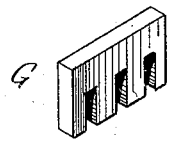
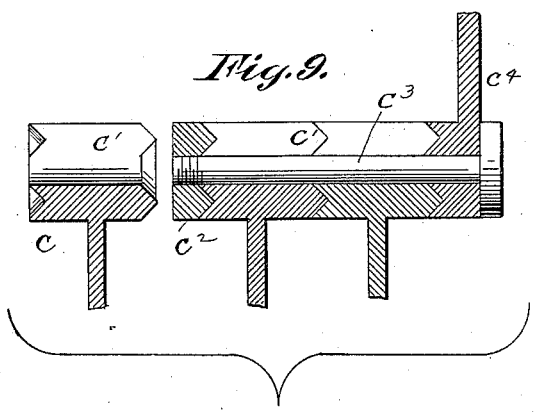
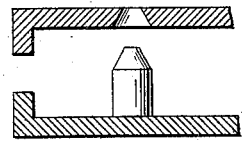
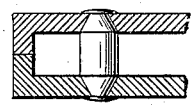
Witnesses:
D. W. Gardner.
W. R. Rosenbaum
Inventor:
Edward R. Knowles
W. T. Johnston

UNITED STATES PATENT OFFICE.

EDWARD R. KNOWLES, OF BROOKLYN, NEW YORK.

SECONDARY-BATTERY PLATE.

SPECIFICATION forming part of Letters Patent No. 397,557, dated February 12, 1889.

Application filed October 29, 1888. Serial No. 289,413. (No model.)

*To all whom it may concern:*

Be it known that I, EDWARD R. KNOWLES, a citizen of the United States, residing in Brooklyn, in the county of Kings and State of New York, have invented certain new and useful Improvements in Secondary-Battery Plates, of which the following is a specification.

My invention relates to secondary batteries, with particular reference to the plates or electrodes of the same.

It is the object of the invention to provide a plate which will efficiently support the active material, which will prevent short-circuiting of the battery, and have reliable means for connection, whereby any plate of a cell may be removed and replaced without hinderance to the other plates of the cell.

It is also the object of the invention to provide means for supporting the plates in the cell.

To these ends the invention consists in the construction hereinafter particularly described, and pointed out in the claims, reference being had to the accompanying drawings, in which—

Figures 1 and 2 represent perspective views of the two parts of the plate as they are separately cast or formed. Fig. 3 represents a perspective view of a portion of three plates connected together. Figs. 4 and 5 represent sectional views of a complete plate; and Figs. 6, 7, 8, 9, 10, and 11 are views of details.

Referring to the drawings by letter, A and B represent the two halves or castings of the plate. The part A has formed upon it extensions or feet $a$ for supporting the plate in the jar. These extensions are made of the thickness of the completed plate. This casting also is formed with a number of holes, $a'$, for a purpose hereinafter set forth. The casting B has formed upon it the upward extension, by which connection is made to the other alternates plates of the cell. This projection $b$ is also of the thickness of the completed plate. Other projections, $b'$, are formed upon the side edges of the plate for a purpose which will appear later on. There are also formed upon this casting lugs or pins $b^2$, which are located to register with the holes $a'$ in the casting A. These two castings, when finished, are placed together, the pins $b^2$ passing into the holes $a'$, and the lower edge of the casting B resting upon the shoulder formed on the legs $a$, and the upper edge of casting A fits in beneath the shoulder formed on the extension $b$, thus making the sides of the finished plate flush. It is also remarked that the side projections, $b'$, are formed of the thickness of the completed plate, so that the shoulders thereon will embrace and partially support the opposite member of the plate. The heads of the pins $b^2$ are now riveted down or capped in any manner desired to secure the parts of the plate together and make it one solid structure.

It has been the object of inventors working in this class of invention to provide efficient means for retaining the active material in the plate and prevent its breaking off and falling to the bottom of the cell. I accomplish this by making the openings in the plate which receive the active material of a greater diameter inside than they are on the outside of the plate.

Referring to Fig. 4, it will be observed that the two castings which form the plate are provided with perforations registering with each other, which, when the parts are placed together, leave chambers in the plate having an internal diameter greater than the diameter of the opening at the surface of the plate. It will thus be seen that when the active material in the form of paste has been placed into these holes and has become hardened it cannot by any means fall out.

By forming the plate in two parts I am enabled to construct it to receive any required amount of active material. This is evidenced by the construction shown in Fig. 5, wherein the inner surfaces of the two castings are ribbed, as shown at $b^3$ $b^3$, thus making the plate thicker and increasing the size of the interior chambers. The general form of the chamber so far as diameter is concerned, however, is retained. This plate is secured together in about the same manner that the plate shown in Fig. 4 is; but I do not confine myself to any particular form of rivet or bolt for securing the same, inasmuch as the construction is subject to many modifications. Figs. 10 and 11 are two of such modifications, that in Fig. 10 being a detached bolt or pin having conical ends, which are adapted to pass into conical openings in each of the castings and be headed on the outside. In Fig. 11 a pin having a conical end is formed upon one casting and is adapted to enter a conical opening in the other casting and be headed on the outside.

The stem or neck of the plate may be cast of some metal which will not flow easily under pressure. This is accomplished by placing a hard-metal lug previously formed into the plate-mold and casting it in with the plate, and it has formed upon its upper end a slotted cylindrical nut, $c$. One end of this nut has a triangular ridge formed upon it, and the opposite end has a corresponding triangular groove, as shown. When several plates are placed together, these grooves or ridges intermesh and form a good contact between each other. A series of the plates may be secured together by dropping a bolt, $c^3$, into the slot $c'$, formed by the registering of all the slots in the adjacent nuts, and then screwing onto the ends of said bolt a circular nut, $c^2$, which has a formation on its inner side to fit the formation of the side of the nut on the plate against which it abuts. The head of the bolt should also have a similar formation on its inner side, so that when the bolt is secured in place all the nuts or plates to which they are attached are tightly secured together and cannot be moved except by the removal of the bolt. This last operation may be very easily and simply accomplished, it being only necessary to unscrew the nut and lift the bolt out of the slot. Any plate of the group may then be removed and replaced without hinderance to the remaining plates. The connecting wire or strip $c^4$ for connecting the plates of one cell with those of the next adjacent cell is provided with a nut having the triangular groove and ridge just described, so that it may take its place upon the bolt next to its head.

The feet, which are cast on the lower edge of the plates, I contemplate covering with an insulating material of any kind, preferably soft rubber or fiberite. This insulation will prevent short-circuiting between the adjacent plates, if by any reason waste material should fill the cell to such an extent that the space between the adjacent plates should be bridged.

The side extensions, $b'$ $b'$, are formed with notches to receive a cross-bar, $d$, of flexible non-conducting material. This cross-bar is cylindrical in shape, and has formed upon it integrally a series of flanges for a purpose to be set forth. The extensions $b'$ on every alternate plate—say the positive plates—have the notches cut on the same side, while the extensions on the intervening plates—say the negative plates—have the notches formed on the under side. By this arrangement the negative plates may be supported by the positive plates when the cross-bar $d$ is resting upon the positive plates and the extensions on the negative plates are resting upon the cross-bar. The flanges on the cross-bar serve to keep the plates apart.

I have also provided a comb, G, of flexible insulating material, preferably soft rubber, which is inserted above and below over the edges of the plates to keep them separated. I am aware that hard rubber and other inflexible non-conducting substances have been used in this particular capacity, and of practically the same shape as I have shown; but I have found that a flexible material is more serviceable for the purpose, in that it allows of a certain amount of freedom in the movement and adjustment of the plates. An inflexible comb would not allow the plates to adjust themselves to any unevenness in the cell or in the bottom thereof.

It is observed that the plates of the cell are set at such a distance apart that a block of active material, should it become detached in any manner from the plate, cannot bridge the gap between the plates. In other words, the space between the plates is greater than the greatest thickness or diameter of the blocks.

Having described my invention, I claim—

1. A plate for secondary batteries, consisting of two halves, one half provided with pins or lugs and the other half with holes to receive the same for securing the parts together.

2. A plate for secondary batteries, formed in two parts, one part having feet formed thereon and the other part having the connecting-lug formed upon it.

3. A plate for secondary batteries, having feet enveloped in insulating material.

4. The combination, with a series of secondary-battery plates, of a series of grooved nuts attached to the connecting-lugs of the plates, said nuts having a groove in one face and a projecting ridge on the other.

5. The combination, with a series of secondary-battery plates, of a series of grooved nuts attached to the connecting-lugs of the plates, said nuts having a groove in one face and a projecting ridge on the other, in combination with a bolt and nut for clamping all of said nuts together.

6. A separating-comb for the plates of a secondary battery, composed of a soft flexible non-conducting material.

7. In a secondary battery, the combination of a series of positive plates provided with side extensions, a series of negative plates provided with side extensions, and a cross-bar of flexible insulating material interposed between the extensions of each series of plates.

8. In a secondary battery, the cross-bar $d$, for supporting adjacent plates, having a series of flanges thereon.

9. In a secondary battery, the cross-bar $d$, of flexible non-conducting material, for supporting adjacent plates.

10. In a secondary battery, the cross-bar $d$, for supporting adjacent plates, made of flexible non-conducting material having a series of flanges thereon.

11. In a secondary battery, two sets of plates, one having upturned side brackets and the other having reversed brackets, in combination with a detached cross-bar adapted to rest upon the upturned brackets and to support the reversed brackets and their plates.

12. A plate for secondary batteries, provided with feet or legs and a number of projections for connecting up and supporting said plate in the cell, said plate being formed or cast in two parts, one of said parts having formed upon it the said connecting-up and supporting projections and the other part having formed upon it the feet or legs, as set forth.

13. As a connecting device for the plates of a secondary battery, a nut secured to each plate having a slot or groove therein, which is adapted to register with the slots in the nuts upon the plates to which it is to be attached in such a manner as to form one continuous straight slot.

14. A series of secondary-battery plates, each provided with a connecting-lug, each of said lugs provided with a notch, groove, or slot adapted to register with all of the slots or grooves in the other plates.

15. A series of secondary-battery plates, each provided with a connecting-lug, each of said lugs provided with a notch, groove, or slot adapted to register with all of the slots or grooves in the other plates, in combination with a bolt adapted to pass into said slots when they are in alignment, and a nut upon said bolt for binding the lugs together.

In witness whereof I have hereunto signed my name in the presence of two subscribing witnesses.

EDWARD R. KNOWLES.

Witnesses:
WM. A. ROSENBAUM,
FRANK C. GRUEN.